Sept. 10, 1940.  J. F. FRATIS  2,214,129
COOKING UTENSIL
Filed July 31, 1939  2 Sheets-Sheet 2
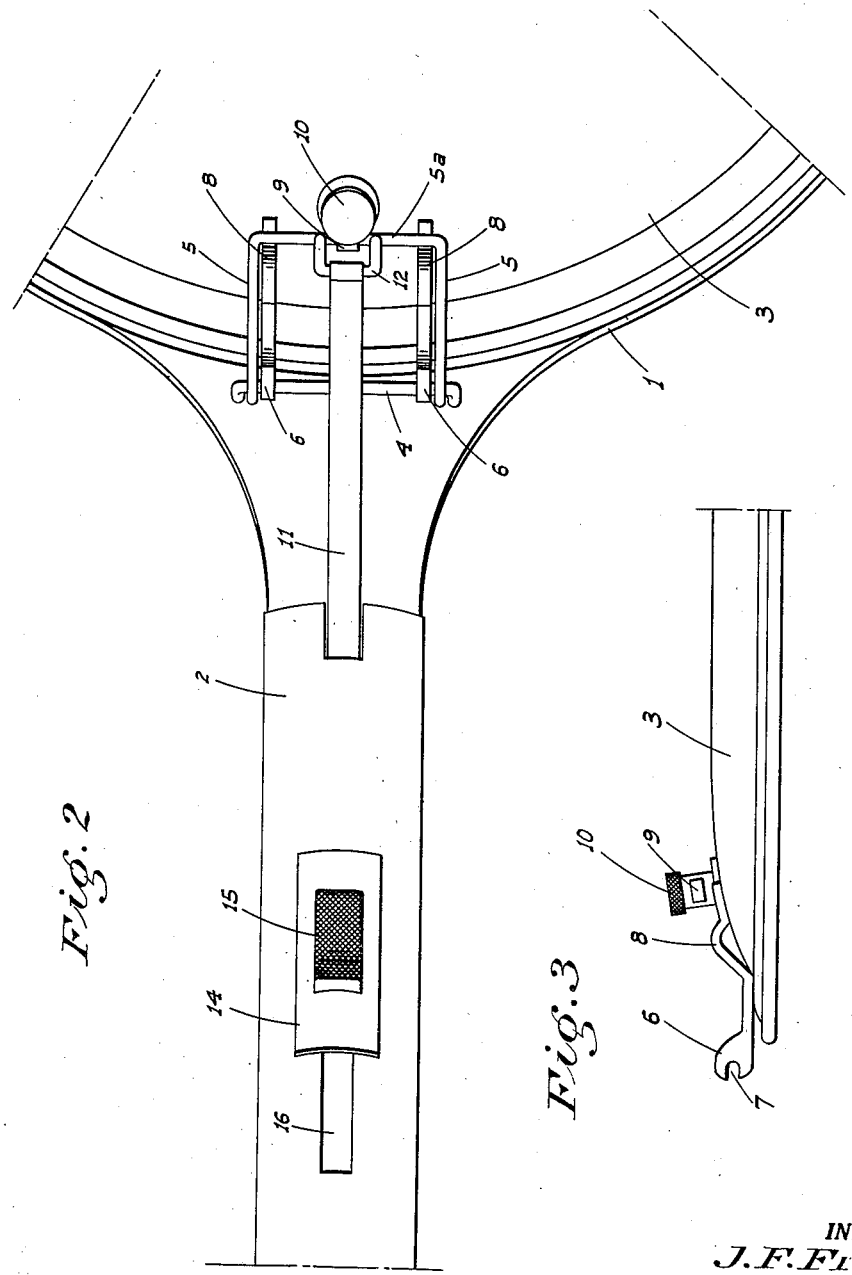
INVENTOR.
J. F. Fratis
BY
ATTORNEY Patented Sept. 10, 1940

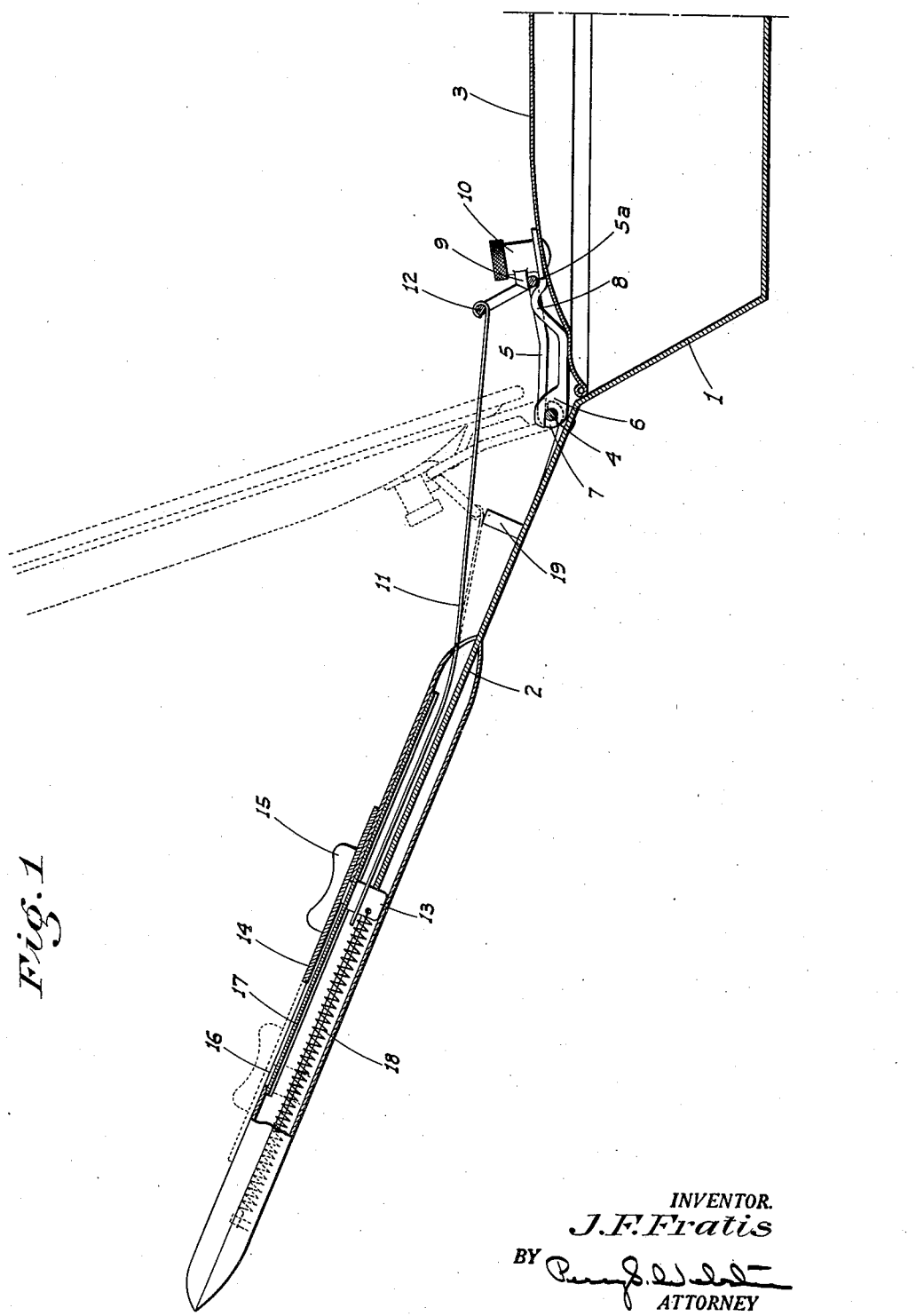

2,214,129

UNITED STATES PATENT OFFICE 2,214,129

COOKING UTENSIL

John F. Fratis, Represa, Calif.

Application July 31, 1939, Serial No. 287,479

9 Claims. (Cl. 53—7)

This invention relates to kitchen utensils, and particularly to frying pans. It is frequently desirable to cover a frying pan while the contents are cooking, but with frying pans as at present made, this can only be done in a makeshift manner, as by means of a tin of some kind. Such an article is usually hard to remove, and the operator is liable to be burned by the grease and heat thrown from the pan.

The principal object is to remedy this objectionable and frequently dangerous defect by providing a lid or cover hingedly mounted on the frying pan and provided with means, operable from the handle of the pan, for opening and closing the lid whenever necessary. At the same time, the lid is arranged so that it may be quickly and easily removed whenever its use on the pan is not desired.

The device also has the obvious advantages of preventing hot grease from being thrown onto the walls, floor or stove, as well as onto the apron of the cook.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a fragmentary sectional elevation of a frying pan equipped with the lid.

Figure 2 is a fragmentary plan of the pan and lid.

Figure 3 is a fragmentary elevation of the lid detached.

Referring now more particularly to the characters of reference on the drawings, 1 denotes a frying pan or cooking vessel of conventional form provided with a hollow radial handle 2. A lid 3 of concave form fits the pan just below its rim.

Secured on the handle adjacent its junction with the pan is a transverse rod 4 serving as a pivot for the side arms of a permanently mounted yoke 5. The lid is provided with lugs 6 spaced to fit between the yoke arms and having notches 7 to slide over the rod 4 by horizontal movement of the lid toward the handle. In line with the lugs are upstanding bosses 8 mounted on the lid in position to be just behind the crossbar 5a of the yoke when the latter is swung down onto the lid.

When the yoke is in this position, the notches 7 straddle the rod 4, and it will be seen that if the yoke is held in such position the lid cannot be removed from association with the pivot rod and can swing with the yoke about said rod as a fulcrum or hinge.

The yoke is disengageably held in said position by means of a latch element 9 positioned to overhang the yoke bar 5a and projecting radially from a turnable knob 10 mounted on the lid just beyond the crossbar and centrally between bosses 8.

The lid of course tends to close of itself, and is swung up when desired by means of a flexible strap 11 connected to an upwardly projecting extension 12 on the yoke bar 5a.

This strap extends into the hollow handle 2 at a point some distance from the pan and is connected within the handle to a stud 13 depending from a saddle 14 slidably mounted on the handle. A thumb piece 15 is mounted on the saddle. The upper face of the handle is provided with a longitudinal slot 16 for the stud, which slot is preferably covered by a strip 17 mounted in connection with the saddle on the inside of the handle. A tension spring 18 connected to the stud and to the handle near its outer end acts to somewhat counteract the tendency of the lid to close and allows the same to close gently and without slamming.

To open the lid, it is therefore only necessary for the operator to pull back on the thumb piece 15, using the thumb of the same hand grasping the handle. Opening movement of the lid is positively limited by the engagement of the yoke extension 12 with a stop 19 on the handle.

When the lid is not needed, it can be removed by merely rotating the knob 10 sufficiently to shift the latch 9 from over crossbar 5a. This allows the yoke to be swung up and clear of bosses 8, which in turn allows the lid to be slid away so as to disengage the notches 7 from rod 6.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a cooking utensil having a cooking vessel and a rigid handle projecting from one side thereof, a lid to cover the vessel, means hingedly and removably mounting the lid on the utensil adjacent the handle for opening and closing movement in a vertical plane, means mounted on the utensil and disengageably applied to the lid to control the movement of the lid and means included in part with said last named means to prevent removal of the lid from the utensil when said last named means is applied to the lid.

2. In a cooking utensil having a cooking vessel and a rigid handle projecting from one side thereof, a lid to cover the vessel, a transverse rod fixed on the handle adjacent the vessel, notched lugs on the lid to removably straddle the rod in turning relation, a yoke turnably mounted on said rod and adapted to be swung down to overhang the lid, means between the lid and yoke to releasably hold the latter in such overhanging position and then maintaining the lugs engaged with the rod and means applied to the yoke and operable from the handle for swinging the yoke about the rod.

3. In a cooking utensil having a cooking vessel and a rigid handle projecting from one side thereof, a lid to cover the vessel, means hingedly mounting the lid on the utensil adjacent the handle for opening and closing movement in a vertical plane, a pull strap flexibly connected to the lid beyond the mounting means and extending thence along the handle, a finger element mounted on the handle and connected to the adjacent end of the strap and a spring between the handle and strap and functioning to exert a pull on the strap in a direction opposite to that imparted thereto by the downward movement of the lid.

4. In a cooking utensil having a cooking vessel and a rigid handle projecting from one side thereof, a lid to cover the vessel, means hingedly mounting the lid on the utensil adjacent the handle for opening and closing movement in a vertical plane, a pull strap flexibly connected to the lid beyond the mounting means and extending thence along the handle, the handle being hollow and the strap projecting into the hollow interior of the handle, the latter having a top longitudinal slot, a finger element slidably mounted on the handle over the slot for movement lengthwise thereof, and a stud rigid with and depending from said element through the slot, the strap being connected to the stud within the handle.

5. A device as in claim 4, with a tension spring connected to the stud and to the handle beyond the limit of movement of the stud.

6. In a cooking utensil having a cooking vessel and a rigid handle projecting from one side thereof, a lid to cover the vessel, a transverse rod fixed on the handle adjacent the vessel, notched lugs on the lid to removably straddle the rod in turning relation, a yoke turnably mounted on said rod and adapted to be swung down to overhang the lid, said yoke including a cross bar at its outer end, bosses upstanding from the lid between the sides of the yoke and just ahead of the crossbar, when the latter is thus swung down, releasable latch means to hold the yoke in such position, and means applied to the yoke and operable from the handle to swing the yoke about the rod.

7. A device as in claim 6, in which said latch means comprises a knob turnably mounted on the lid adjacent the crossbar of the yoke and intermediate the ends thereof and an element rigid with and projecting radially from the knob to overhang the crossbar when the latter is immediately adjacent the lid.

8. In a cooking utensil having a cooking vessel and a rigid handle projecting from one side thereof, a lid to cover the vessel, means removably mounting the lid on the utensil for opening and closing movement, and means disengageably connected between the handle and lid to control the movement thereof and operable when engaged to prevent removal of the lid.

9. In a cooking utensil having a cooking vessel and a rigid handle projecting from one side thereof, a lid to cover the vessel, means hingedly mounting the lid on the utensil adjacent the handle for opening and closing movement in a vertical plane, the handle being hollow, a pull strap connected to the lid and projecting into the handle to a termination within the hollow interior thereof, said handle having a longitudinal slot and means including a finger element connected to the strap within the handle and projecting through the slot for manipulation exteriorly of the handle.

JOHN F. FRATIS.